(12) United States Patent
Curran et al.

(10) Patent No.: US 11,889,791 B2
(45) Date of Patent: Feb. 6, 2024

(54) FOLDABLE RAKE WITH POP-OUT RAKE HEADS

(71) Applicants: Ryan Curran, Barrie (CA); Michael White, Vancouver (CA); Richard Gregory Elmer, Cochrane (CA)

(72) Inventors: Ryan Curran, Barrie (CA); Michael White, Vancouver (CA); Richard Gregory Elmer, Cochrane (CA)

(73) Assignee: Curran Golf Inc., Barrie (CA)

( * ) Notice: Subject to any disclaimer, the term of this patent is extended or adjusted under 35 U.S.C. 154(b) by 214 days.

(21) Appl. No.: 17/187,854

(22) Filed: Mar. 22, 2021

(65) Prior Publication Data

US 2021/0378166 A1    Dec. 9, 2021

Related U.S. Application Data

(60) Provisional application No. 63/036,259, filed on Jun. 8, 2020.

(51) Int. Cl.
*A01D 7/04* (2006.01)
*A63B 57/50* (2015.01)

(52) U.S. Cl.
CPC ........... *A01D 7/04* (2013.01); *A63B 57/50* (2015.10)

(58) Field of Classification Search
CPC ............... A01D 7/00–7/10; A63B 57/50
See application file for complete search history.

(56) References Cited

U.S. PATENT DOCUMENTS

| | | | | |
|---|---|---|---|---|
| 2,110,538 A | * | 3/1938 | Walsh | A01D 7/00 56/400.21 |
| 2,902,815 A | * | 9/1959 | Gallo, Sr. | A01D 7/10 294/50.8 |
| 3,855,766 A | * | 12/1974 | Lutz | A01D 7/04 56/400.18 |
| 4,054,313 A | * | 10/1977 | Ciuci | E01C 23/082 172/372 |
| 4,289,344 A | * | 9/1981 | Mitchell | A01D 7/00 172/372 |
| 5,590,924 A | * | 1/1997 | Quinn | A63B 47/02 294/19.2 |
| 6,058,691 A | * | 5/2000 | Greeves | A63B 57/50 56/400.04 |
| 7,299,614 B2 | * | 11/2007 | Sanders | A01D 7/00 56/400.21 |
| 2006/0168935 A1 | * | 8/2006 | Sanders | A01D 7/00 56/400.16 |

FOREIGN PATENT DOCUMENTS

| | | | | |
|---|---|---|---|---|
| GB | 1517916 A | * | 7/1978 | ........... A01D 7/04 |
| GB | 2250414 A | * | 6/1992 | ........... A01D 7/00 |
| WO | WO-9407353 A1 | * | 4/1994 | ........... A01D 7/00 |

* cited by examiner

*Primary Examiner* — Thomas B Will
*Assistant Examiner* — Madeline I Runco
(74) *Attorney, Agent, or Firm* — Capitol City TechLaw, PLLC; Samuel P Burkholder

(57) ABSTRACT

A device for leveling a surface; the device includes a shaft, a handle-means and a head-assembly. The shaft is selectively retractable, and the head-assembly is foldable to enable compact storage. The device is for personal use by a user in leveling a surface; for example, a sand bunker/sand trap on a golf course. In some versions, the device further includes an attachment-means for attaching the device to a bag.

15 Claims, 17 Drawing Sheets

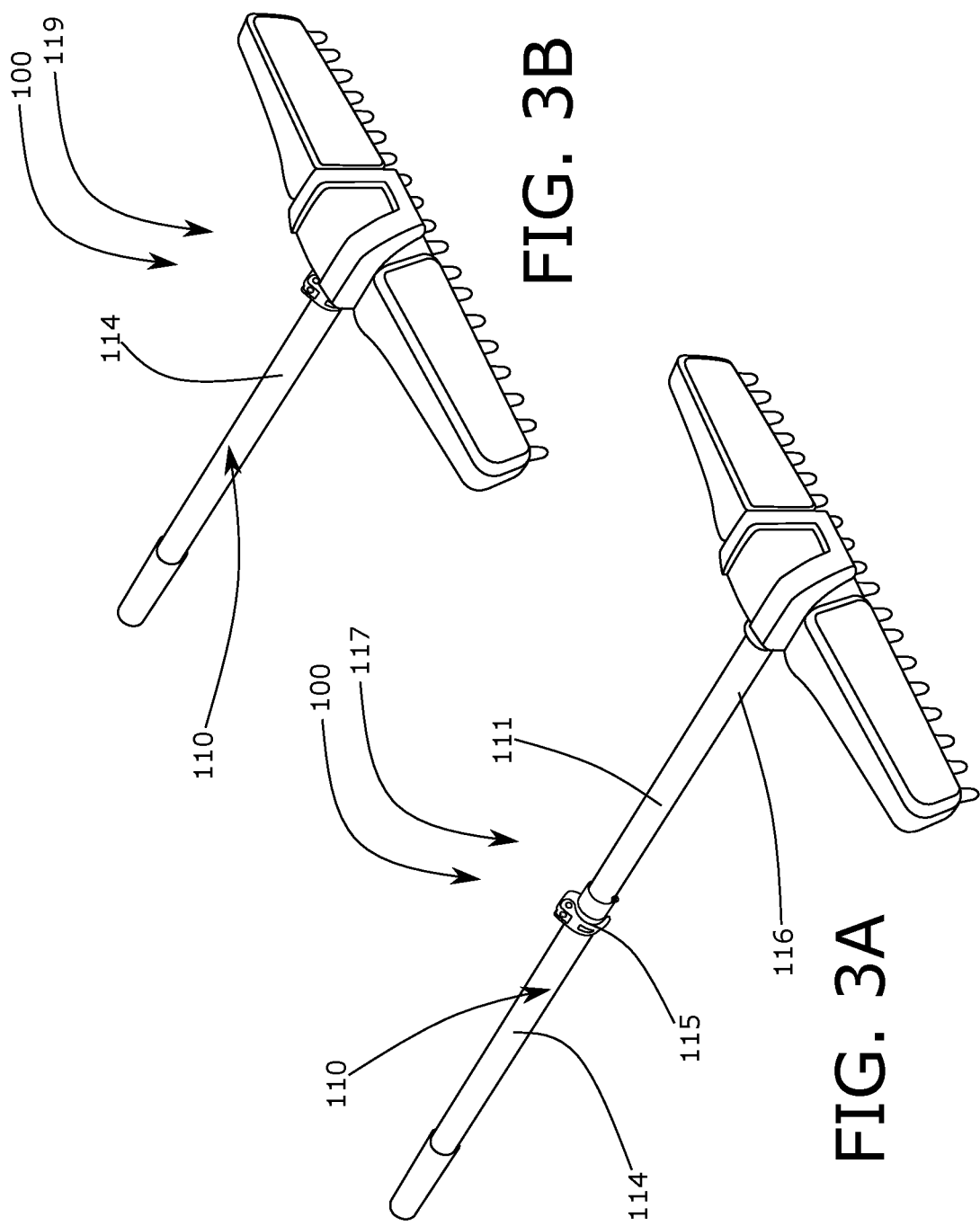

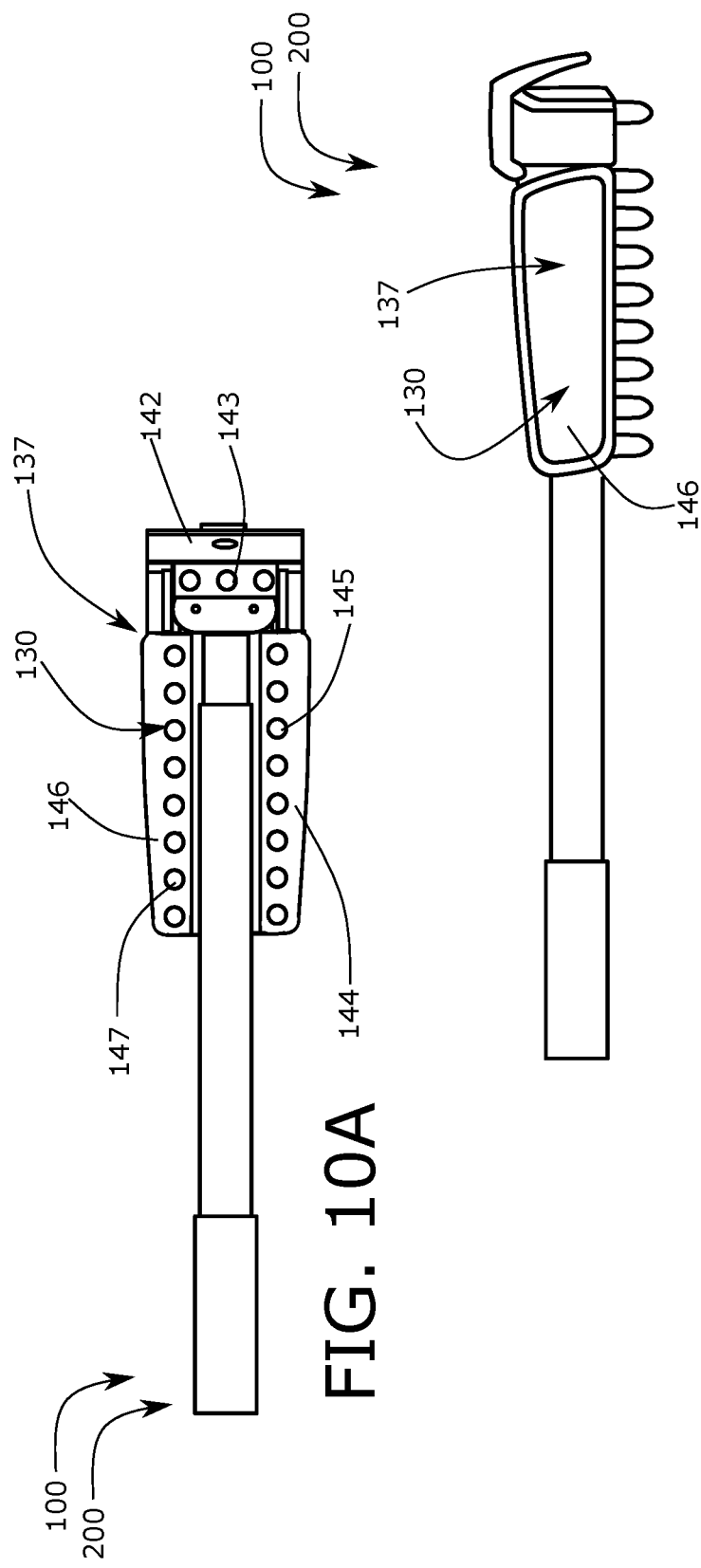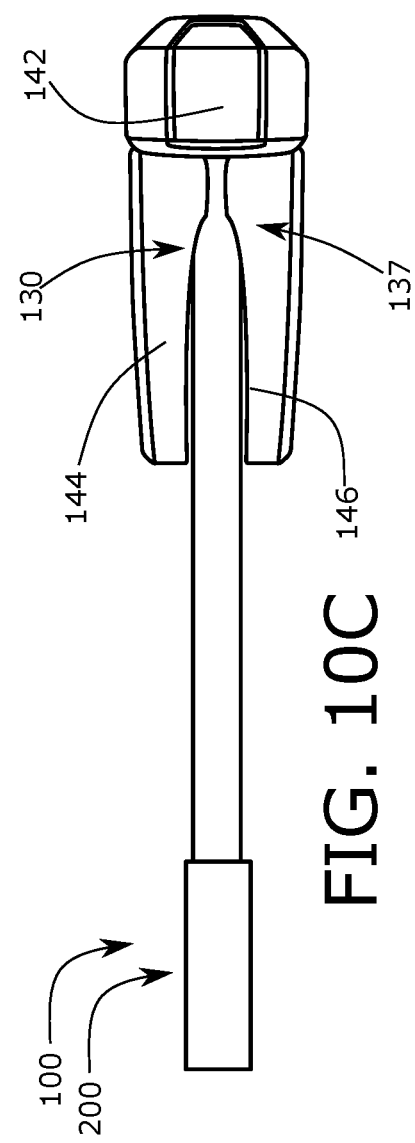

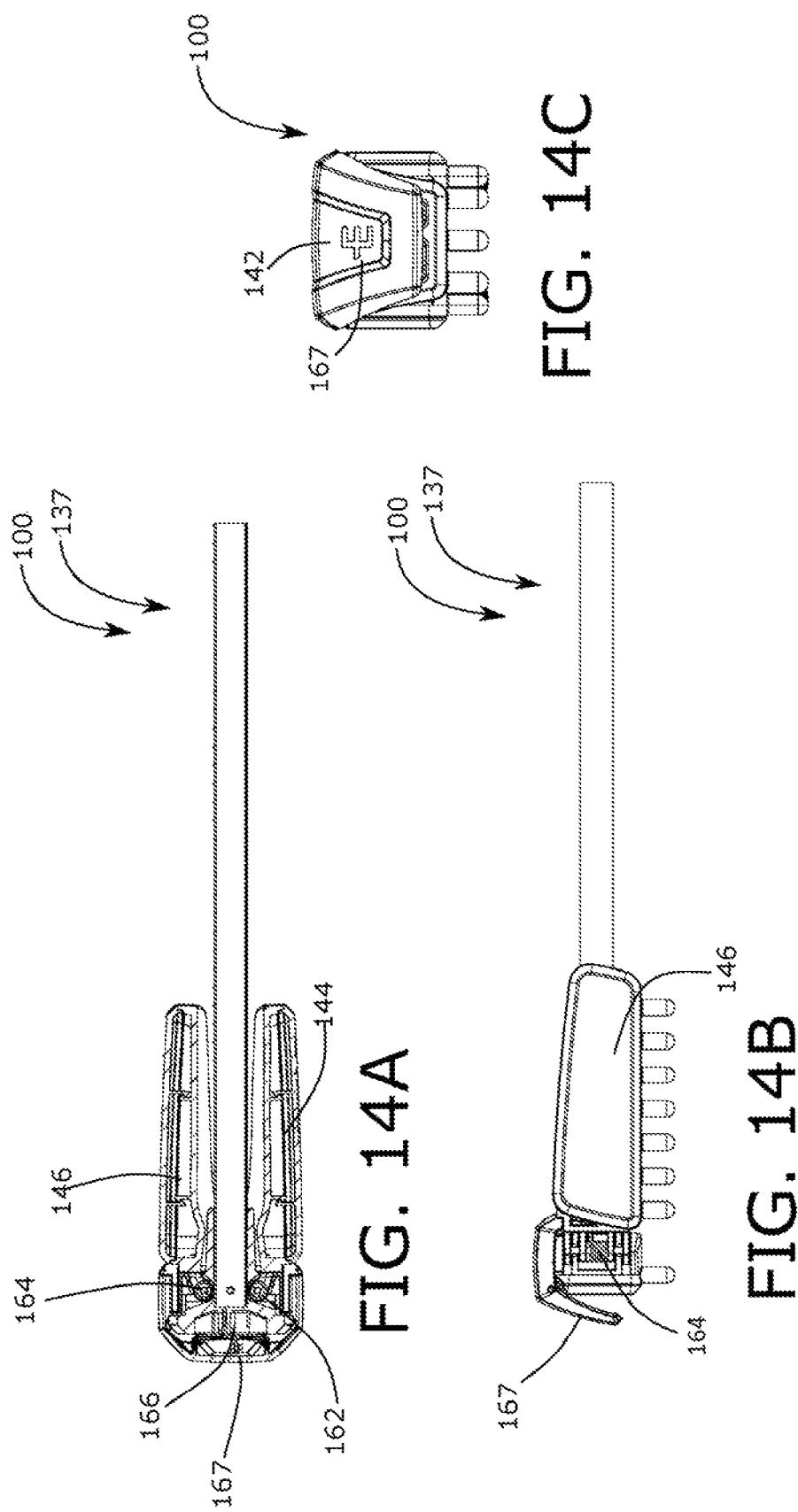

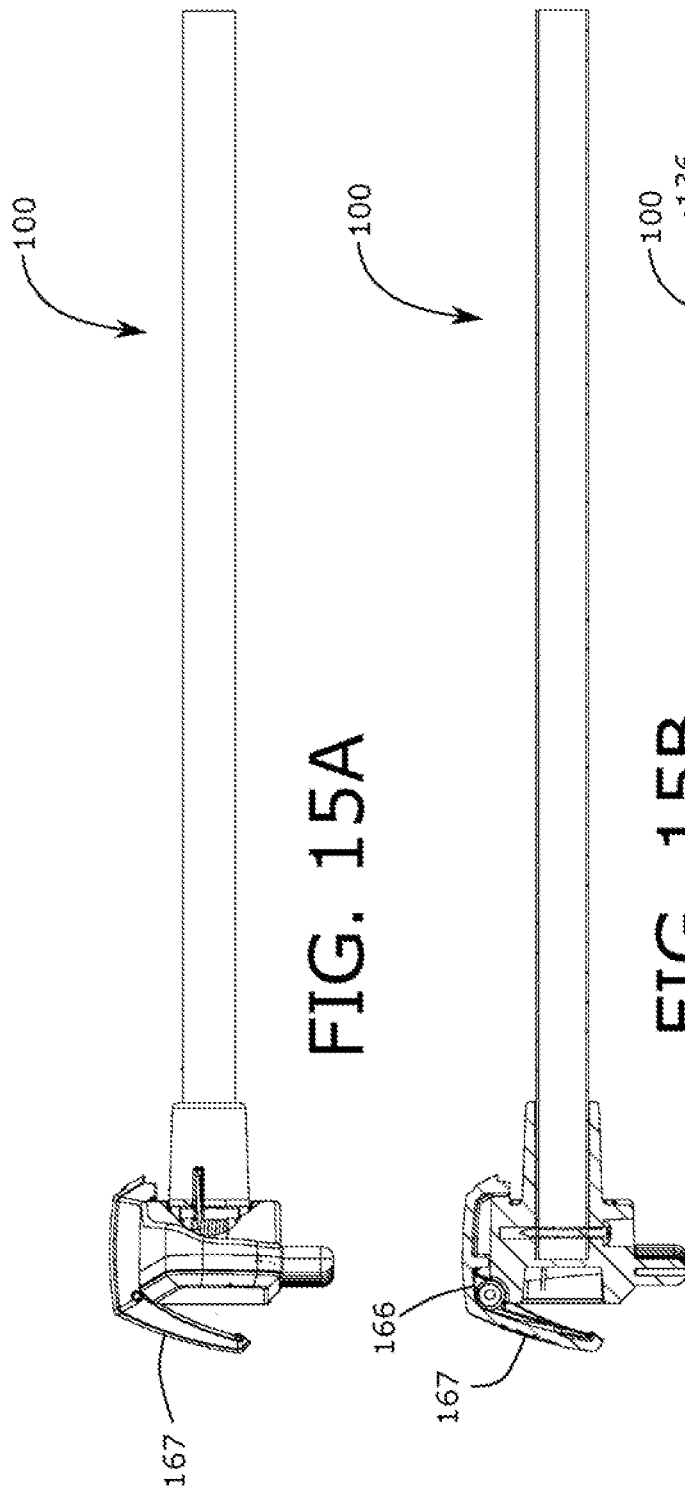
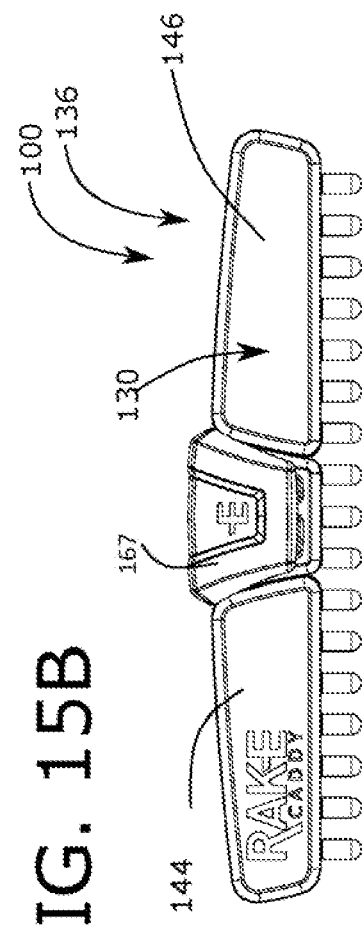
FIG. 15A
FIG. 15B
FIG. 15C

FOLDABLE RAKE WITH POP-OUT RAKE HEADS

CROSS-REFERENCE TO RELATED APPLICATION(S)

The present application is related to and claims priority to U.S. Provisional Patent Application No. 63/036,259 filed Jun. 8, 2020, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of ground leveling devices of existing art and more specifically relates to a portable, personal rake.

RELATED ART

In general, a rake is a tool designed for outside use in a variety of applications such as in collecting leaves, loosening soil, leveling or smoothing surfaces, etc. A rake typically consists of an elongated handle and a plurality of teeth, or tines, fixed to one end of the elongated handle. In the game of golf, rakes have been used to level and smooth sand bunkers. According to golf etiquette, a player should rake the sand smooth after their shot to leave a fresh surface for subsequent players. As a result, golf courses typically provide a rake alongside each sand bunker.

Due to this custom, each rake is undoubtedly touched by numerous players. This provides an opportunity for bacteria, viruses, and other pathogens to spread from person to person throughout the day. Further, it is unknown how often, or if at all, the rake is disinfected. As such, pathogens may live on the rake for days, thus increasing the opportunity for pathogen spread between people.

This issue is particularly concerning during times of pandemic and epidemics where pathogens are able to live on surfaces and spread to humans through their contact with infected surfaces—as was seen with the COVID-19 pandemic. A solution that some golf clubs employed was to completely remove rakes from golf courses. However, this is not an effective solution, as it impedes the game of golf to leave unleveled sand bunkers for players. Thus, a need exists for a reliable PERSONAL RAKE to avoid the above-mentioned problems.

SUMMARY OF THE INVENTION

In view of the foregoing disadvantages inherent in the known rake art, the present disclosure provides a novel personal-use rake. The general purpose of the present disclosure, which will be described subsequently in greater detail, is to provide an easily transportable rake for personal use by a user in leveling a surface.

A device is disclosed herein. The device includes a shaft, a handle-means, and a head-assembly. The shaft may include an elongated profile having an adjustable length. The handle-means may be attached to a first end of the shaft and the head-assembly may be attached about a second end of the shaft. The head-assembly may include a mid-section, a first half pivotally attached to a first side of the mid-section, and a second half pivotally attached to a second side of the mid-section. The mid-section may be attached to the second end of the shaft. The first half and the second half may be pivotable between a folded-position and an in-use position. The first half and the second half in the in-use position are used to level the surface.

According to another embodiment, a method of using a device for leveling a surface is also disclosed herein. The method includes providing the device as above; placing the first half and the second half of the head-assembly in the in-use position; adjusting the adjustable length of the shaft to a desired position; grasping the handle-means; and using the device to level the surface with the head-assembly.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a personal-use rake, constructed and operative according to the teachings of the present disclosure.

FIG. 3A is a side front perspective view of the device of FIG. 1 illustrating a shaft in an extended position, according to an embodiment of the present disclosure.

FIG. 3B is a side front view perspective of the device of FIG. 1 illustrating a shaft in a retracted position, according to an embodiment of the present disclosure.

FIG. 10A is a bottom view of the device of FIG. 1 illustrating the head-assembly in a folded-position, to an embodiment of the present disclosure.

FIG. 10B is a side view of the device of FIG. 1 illustrating the head-assembly in the folded-position, according to an embodiment of the present disclosure.

FIG. 10C is a top view of the device of FIG. 1 illustrating the head-assembly in the folded-position, according to an embodiment of the present disclosure.

FIG. 14A is a bottom view of the device of FIG. 1 showing the pop-out mechanism of the head-assembly, with the head-assembly in the folded-position, according to an embodiment of the present disclosure.

FIG. 14B is a side view of the device of FIG. 1 showing the pop-out mechanism of the head-assembly, with the head-assembly in the folded-position, according to an embodiment of the present disclosure.

FIG. 14C is a front view of the device of FIG. 1 showing the head-assembly, according to an embodiment of the present disclosure.

FIG. 15A is a side view of the device of FIG. 1 showing the pop-out mechanism of the head-assembly, according to an embodiment of the present disclosure.

FIG. 15B is a side view of the device of FIG. 1 showing the pop-out mechanism of the head-assembly, according to an embodiment of the present disclosure.

FIG. 15C is a front view of the device of FIG. 1 showing the head-assembly in the in-use position, according to an embodiment of the present disclosure.

The various embodiments of the present invention will hereinafter be described in conjunction with the appended drawings, wherein like designations denote like elements.

DETAILED DESCRIPTION

As discussed above, embodiments of the present disclosure relate to a rake and more particularly to a personal rake as used to level or rake a surface. Preferably, the personal rake may be a personal sand rake which may be used in golf course maintenance, however, other uses for the personal rake are also contemplated. The personal rake provides a user with an easily transportable and storable tool for their own personal use.

Generally disclosed is a rake that may be compact and attachable to a golf bag. The rake may include a retractable pole made from a lightweight material and a rake head attached to the retractable pole. The retractable pole may be retractable in 1-foot (12") increments. The lightweight material may be an aluminum material, carbon fiber, or the like. The rake head may be approximately 12 inches wide. The rake head may include a fold line at a center thereof such that the rake head may be folded for compact storage. In some embodiments, the rake head may be made from a polyethylene material.

Referring now more specifically to the drawings by numerals of reference, there is shown in FIGS. 1-16C, various views of a device for leveling a surface ("device" 100).

Figure 1:
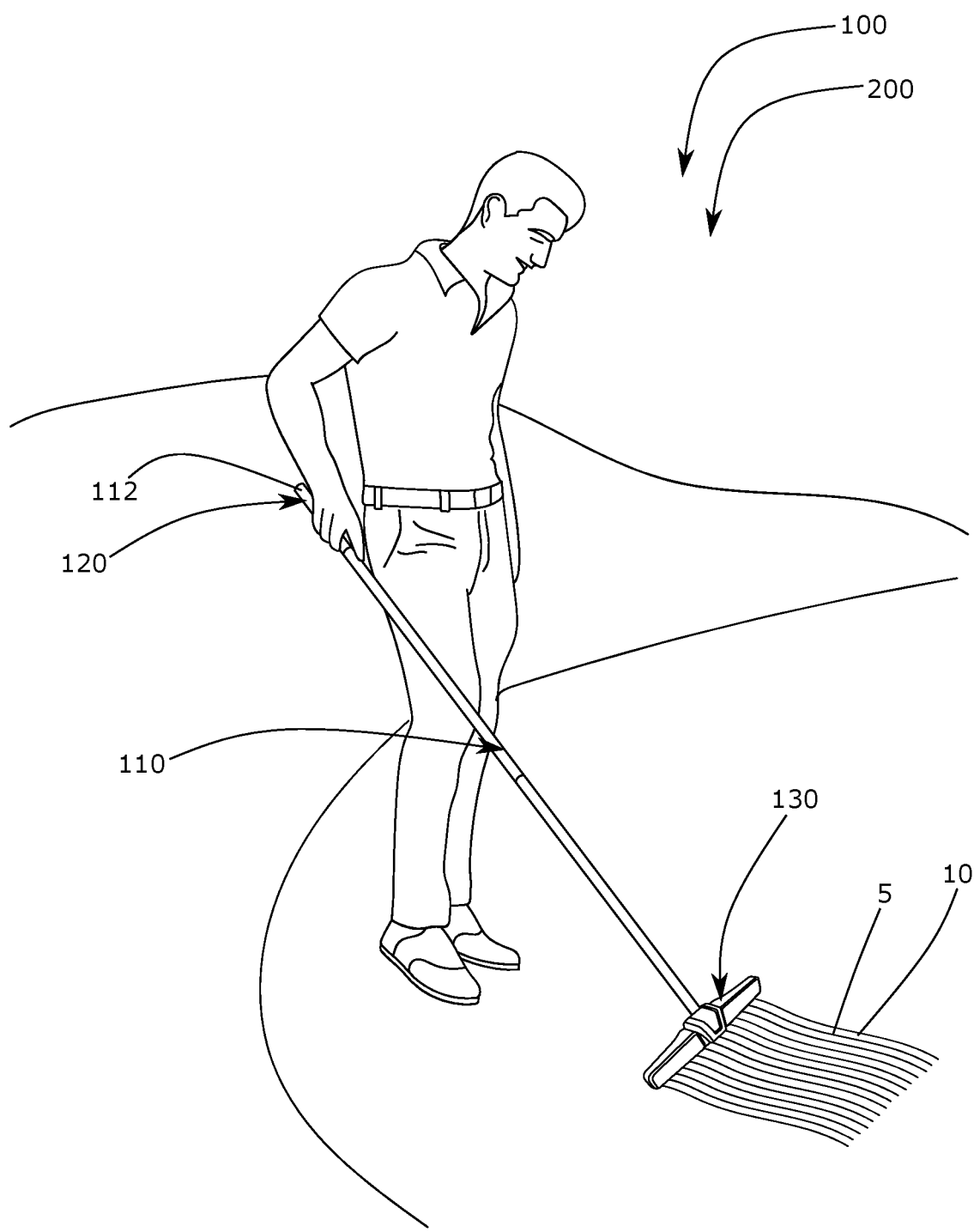
FIG. 1 is a side front perspective view of a device during an 'in-use' condition, according to an embodiment of the disclosure.

FIG. 1 shows a device 100 during an 'in-use' condition, according to an embodiment of the present disclosure. Here, the device 100 may include a shaft 110, a handle-means 120, and a head-assembly 130. As shown, the surface 5 may be a sand surface 10 and the device 100 may be a sand rake 200 for raking (and leveling) the sand surface 10. In this embodiment, the head-assembly 130 may include a rake configuration. Particularly this may be useful for use in a sand bunker or sand trap on a golf course. However, the device 100 is also contemplated for use in other applications and on other surfaces 5. For example, the device 100 may be used in landscaping, in raking sand/stones on a beach, etc.

The handle-means 120 may be attached to a first end 112 of the shaft 110. As shown, the handle-means 120 may be grasped by a user when they are using the device 100 to level the surface 5. In some embodiments, the handle-means 120 may include a non-slip material, such as rubber, silicone, etc. to improve grip on the device 100. In some embodiments, the handle-means 120 may further include a soft material such as foam for providing cushion to a hand of the user. It should be appreciated that these materials are given as examples and the handle-means 120 are not limited to those exemplary materials provided.

Figure 2:
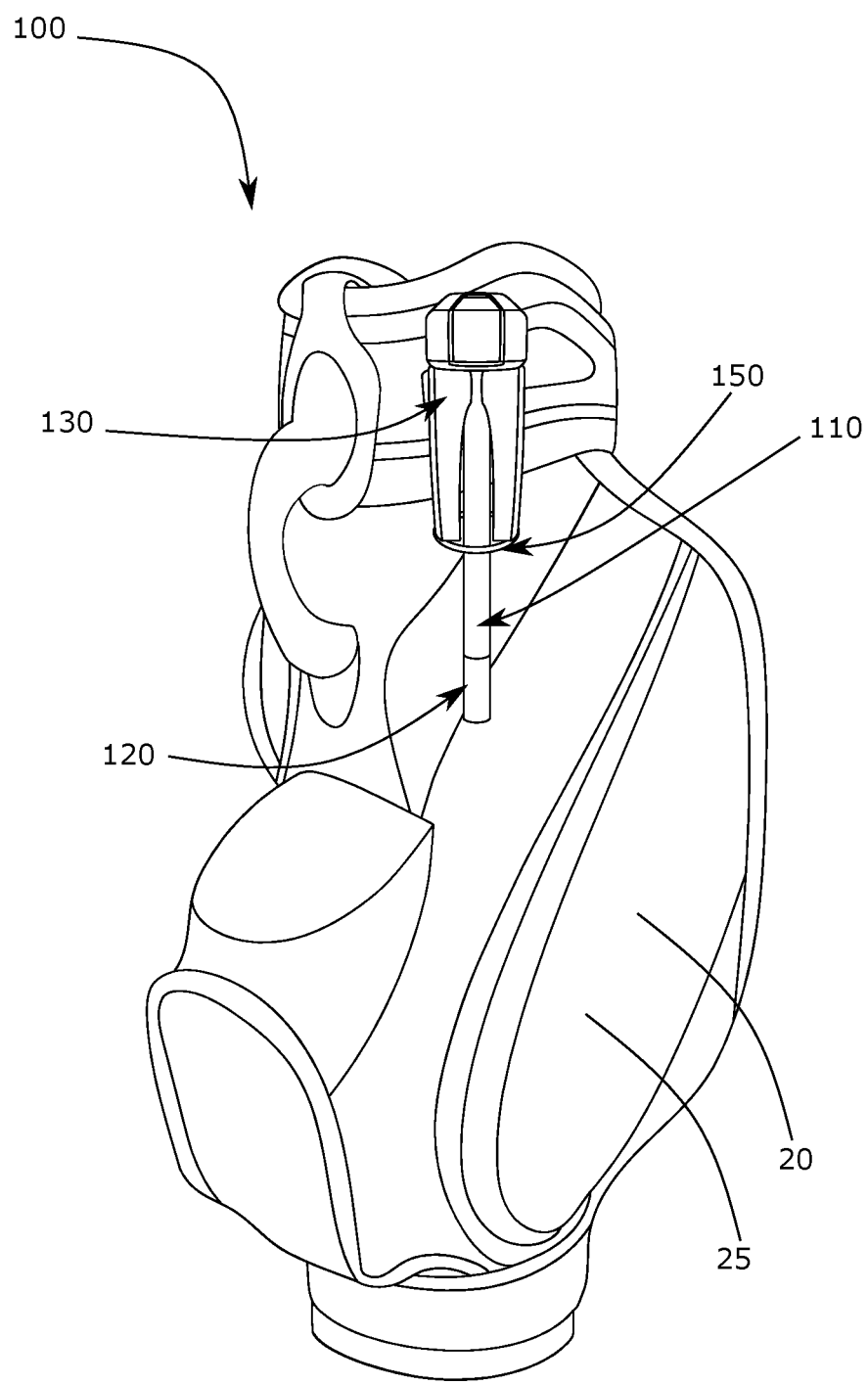
FIG. 2 is a front perspective view of the device being attached to a bag, according to an embodiment of the disclosure.
Figure 4A:
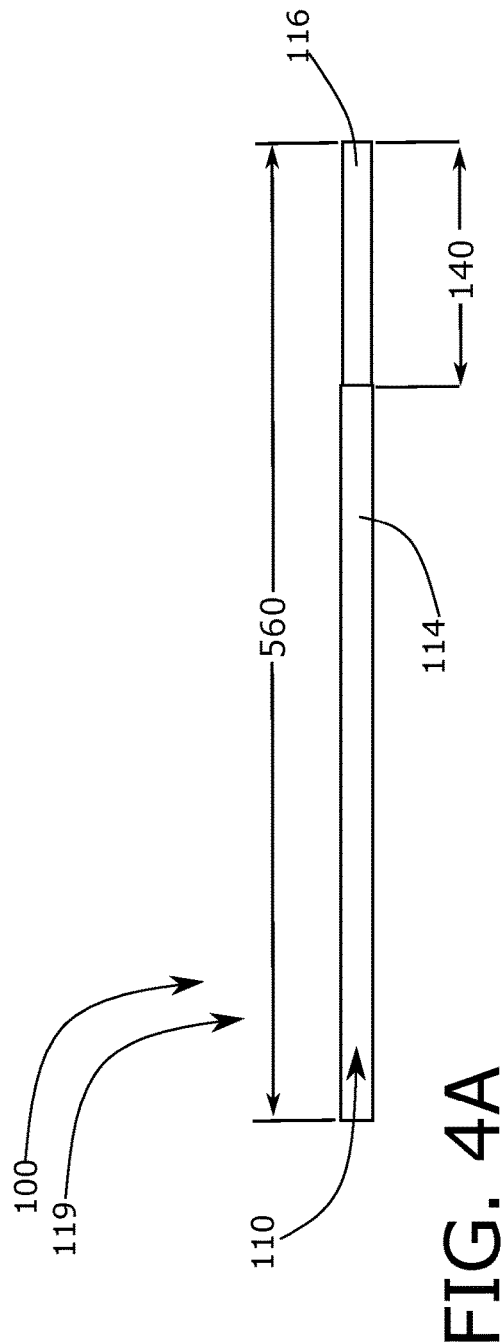
FIG. 4A is a side view of the device of FIG. 1 illustrating the shaft in the retracted position and demonstrating a length thereof, according to an embodiment of the present disclosure.
Figure 4B:
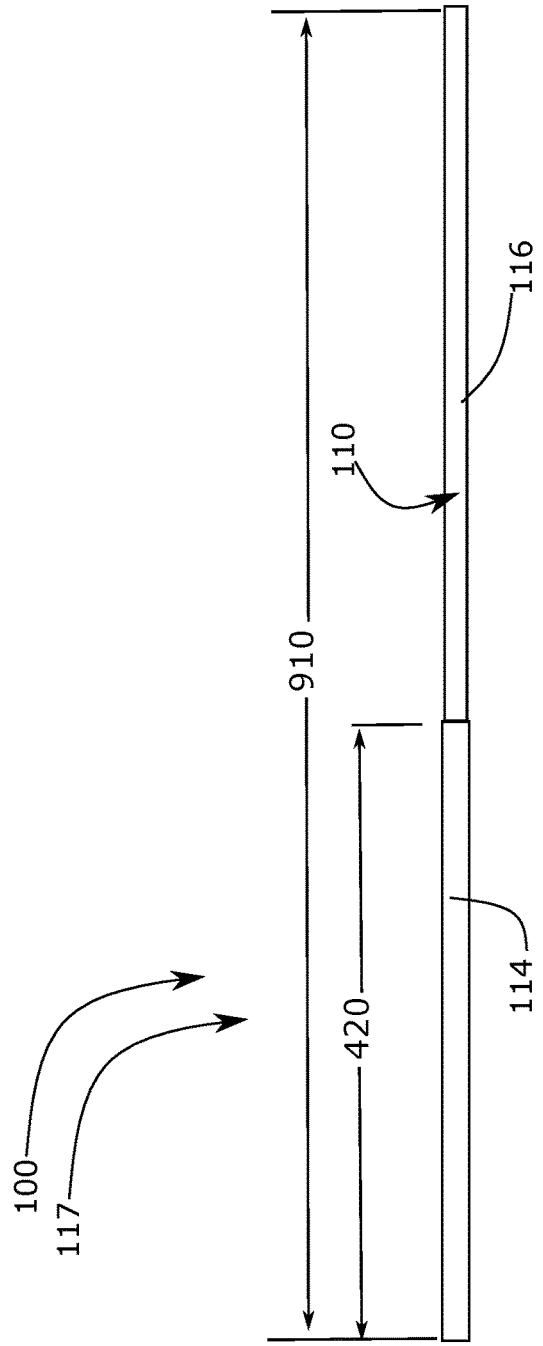
FIG. 4B is a side view of the device of FIG. 1 illustrating the shaft in the extended position and demonstrating a length thereof, according to an embodiment of the present disclosure.
Figure 5:
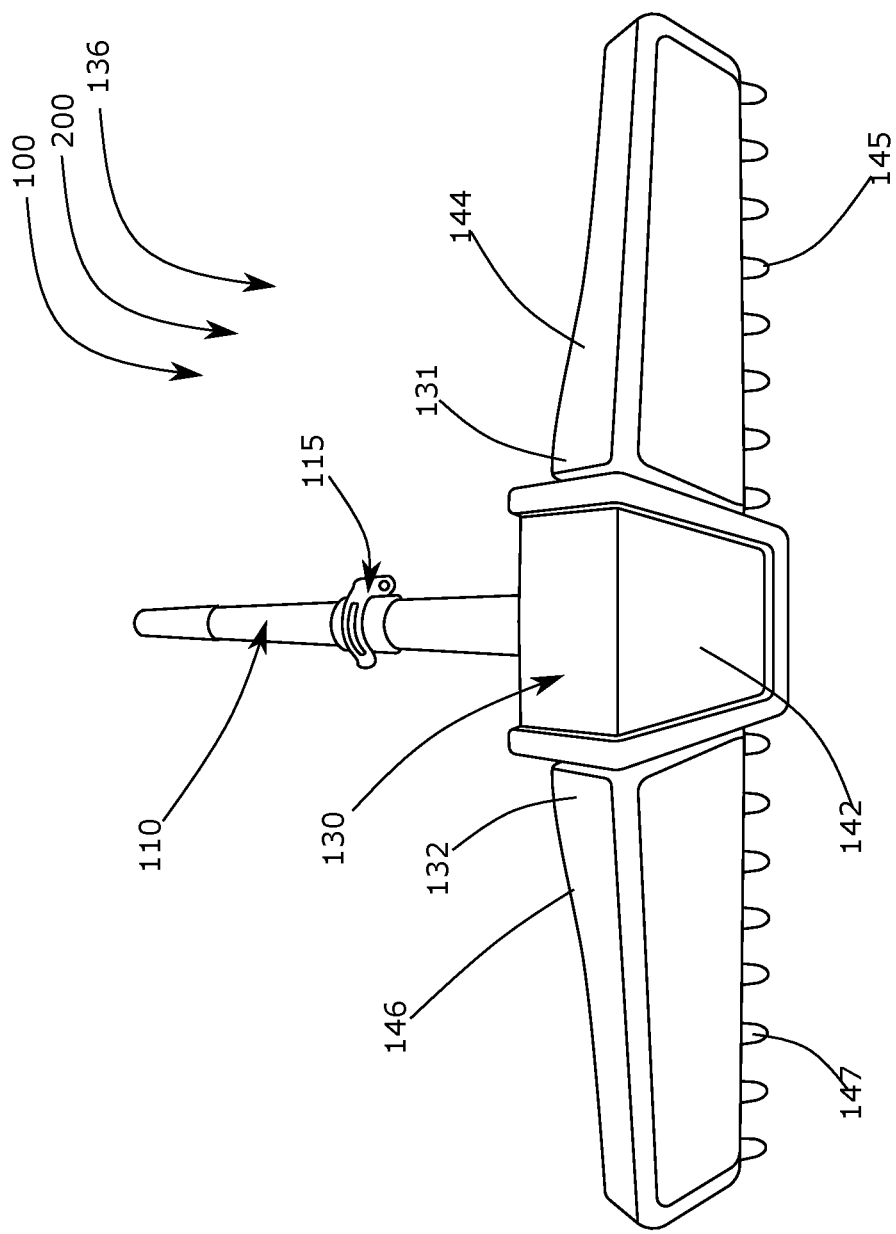
FIG. 5 is a front top perspective view of the device of FIG. 1, according to an embodiment of the present disclosure.
Figure 6A:
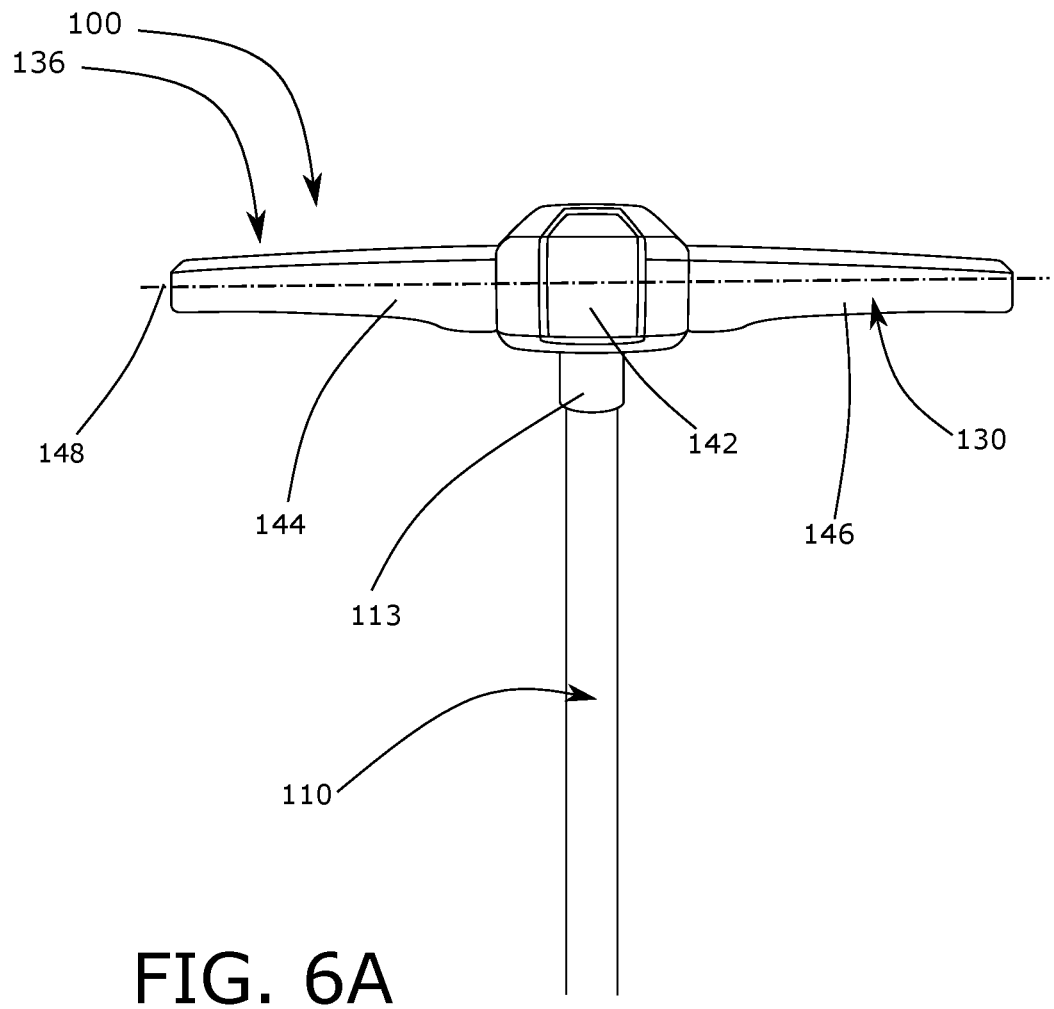
FIG. 6A is a top view of the device of FIG. 1 showing a head-assembly having a horizontal axis in an in-use position, according to an embodiment of the present disclosure.
Figure 6B:
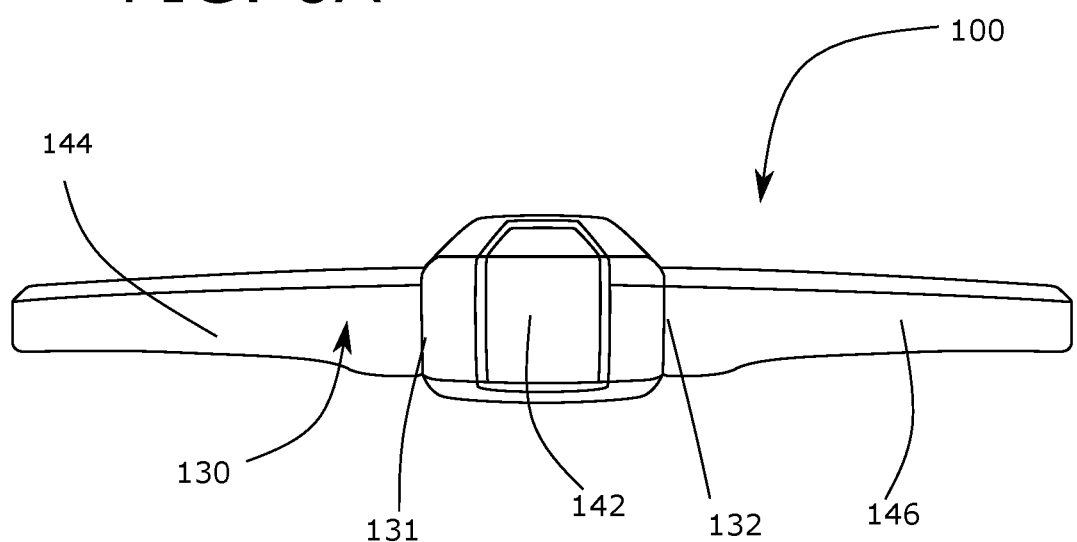
FIG. 6B is a top view of the device of FIG. 1 showing the head-assembly in the in-use position, according to an embodiment of the present disclosure.
Figures 7A, 7B:
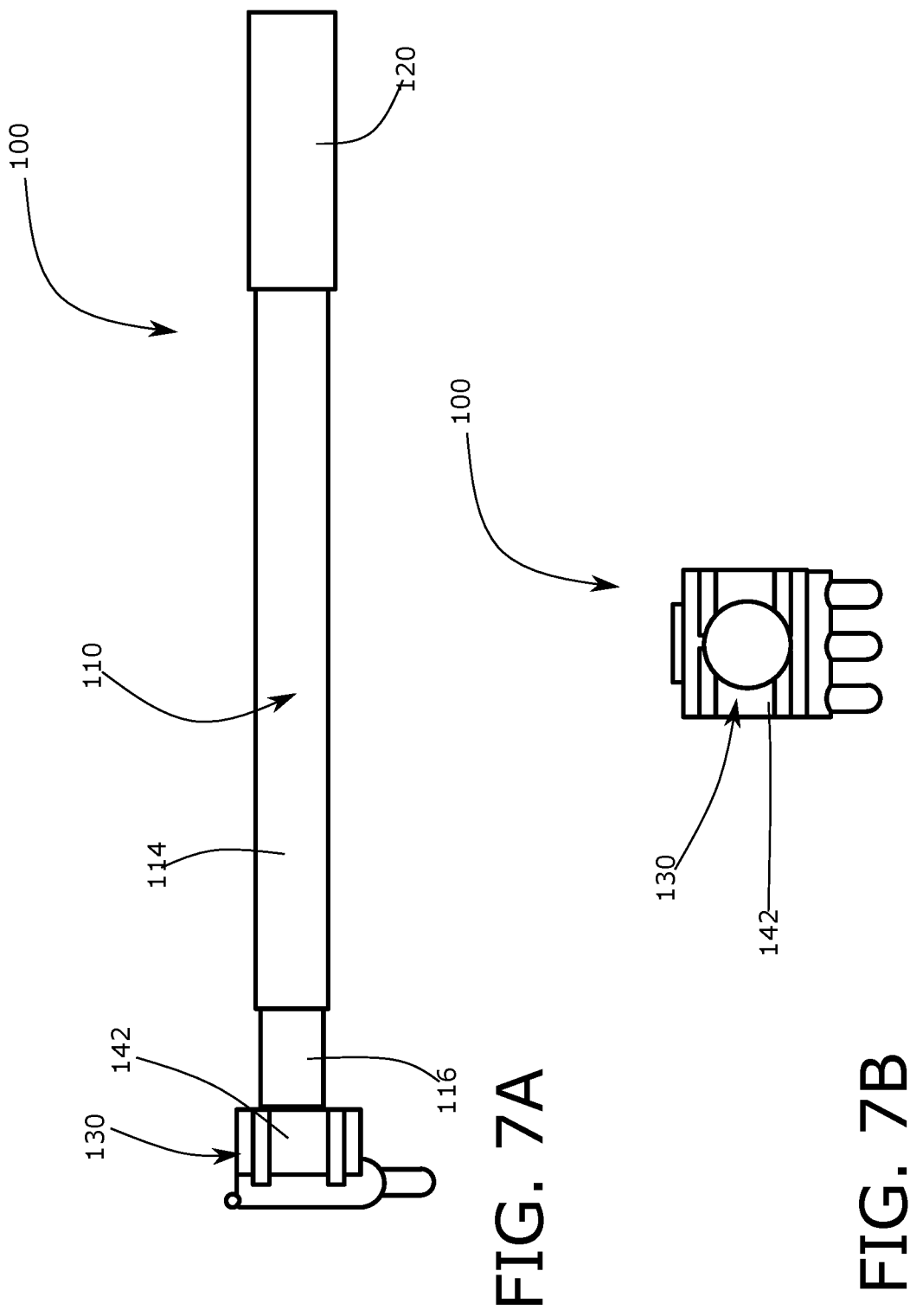
FIG. 7A is a side view of the device of FIG. 1 showing the head-assembly attached to the shaft, according to an embodiment of the present disclosure.
FIG. 7B is a front view of the device of FIG. 1 showing a mid-section of the head-assembly, according to an embodiment of the present disclosure.
Figure 8:
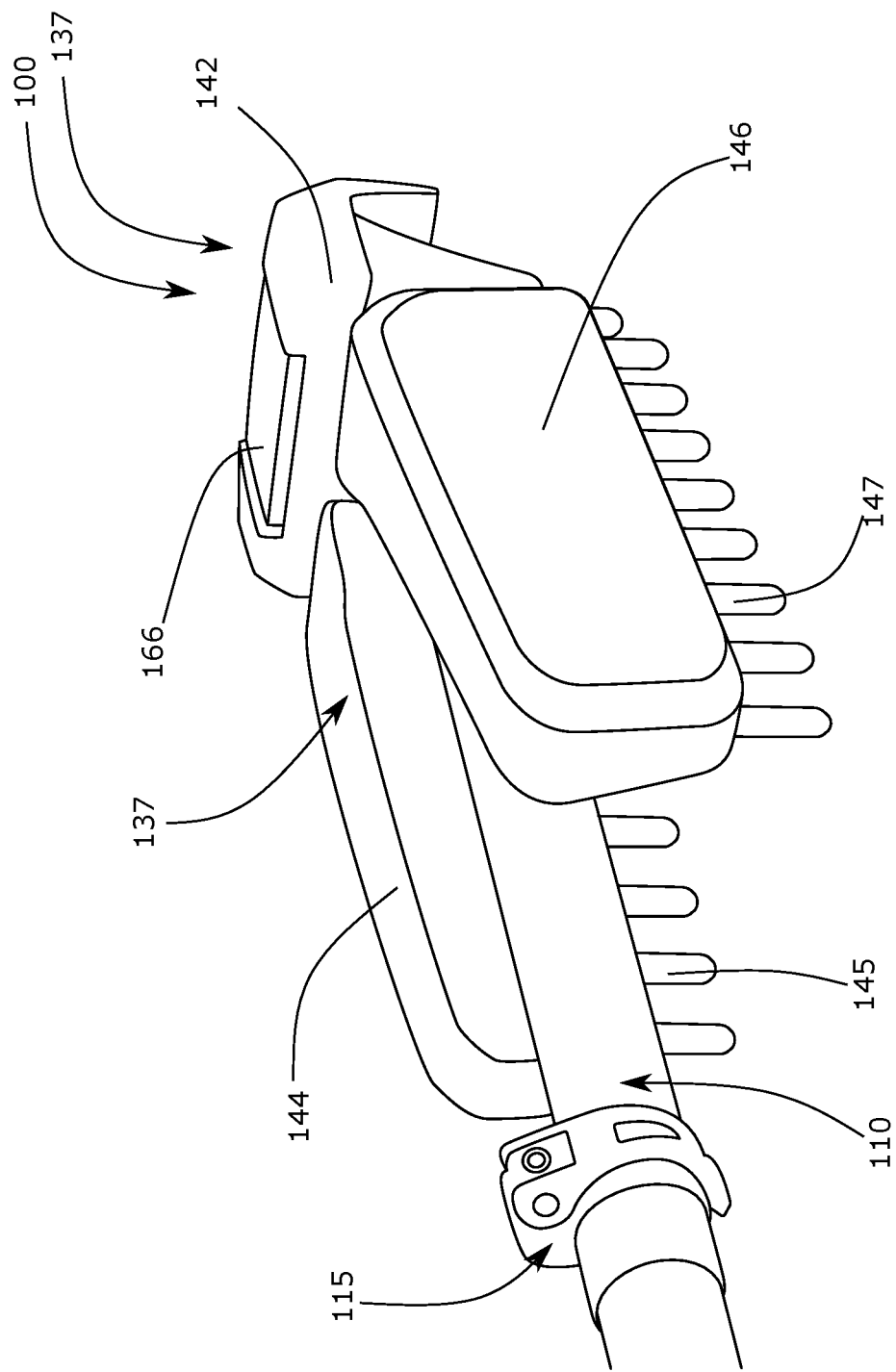
FIG. 8 is a rear side perspective view of the device of FIG. 1 showing the head-assembly attached to the shaft and including a first half, a second half and the mid-section, according to an embodiment of the present disclosure.
Figure 9A:
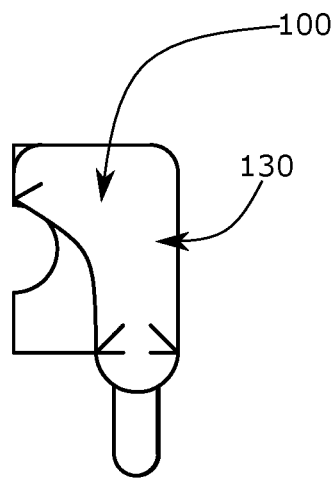
FIG. 9A is a right side view of the device of FIG. 1 showing one half of the head-assembly, according to an embodiment of the present disclosure.
Figure 9B:
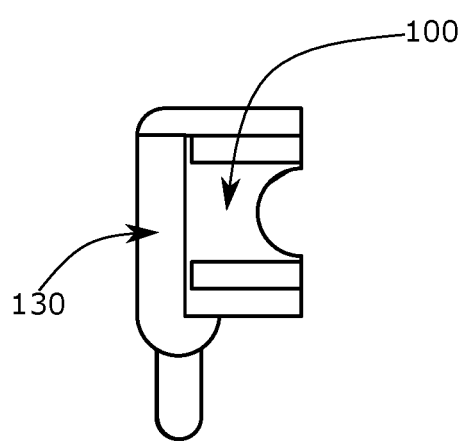
FIG. 9B is a left side view of the device of FIG. 1 showing one half of the head-assembly, according to an embodiment of the present disclosure.
Figure 9C:
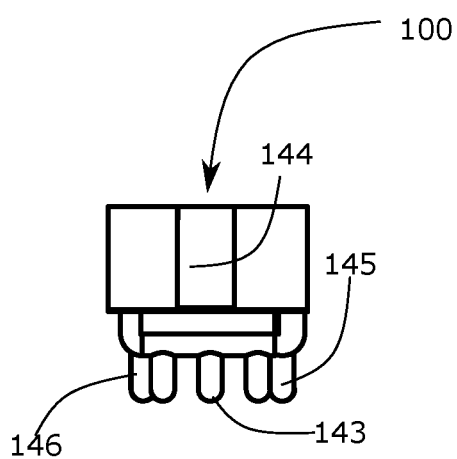
FIG. 9C is a front view of the device of FIG. 1 showing the mid-section of the head-assembly according to an embodiment of the present disclosure.
Figure 9D:
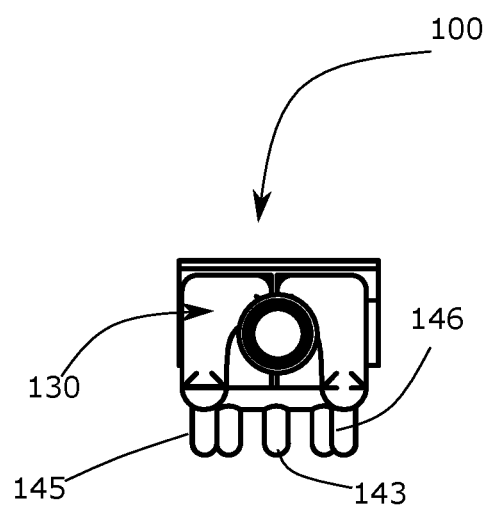
FIG. 9D is a rear view of the device of FIG. 1 showing the mid-section of the head-assembly, according to an embodiment of the present disclosure.
Figure 11:
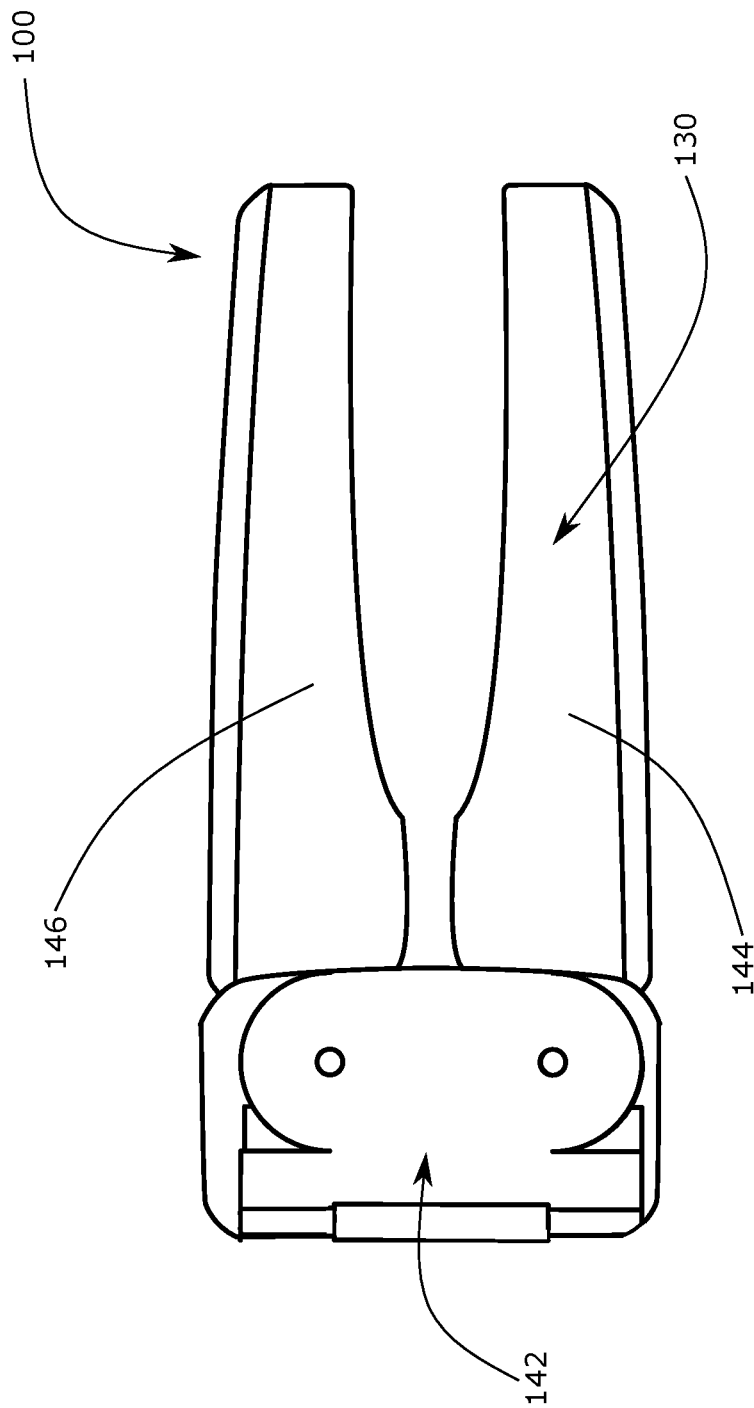
FIG. 11 is a top view of the device of FIG. 1 showing the head-assembly having a hinge, according to an embodiment of the present disclosure.
Figures 12A, 12B, 12C, 12D:
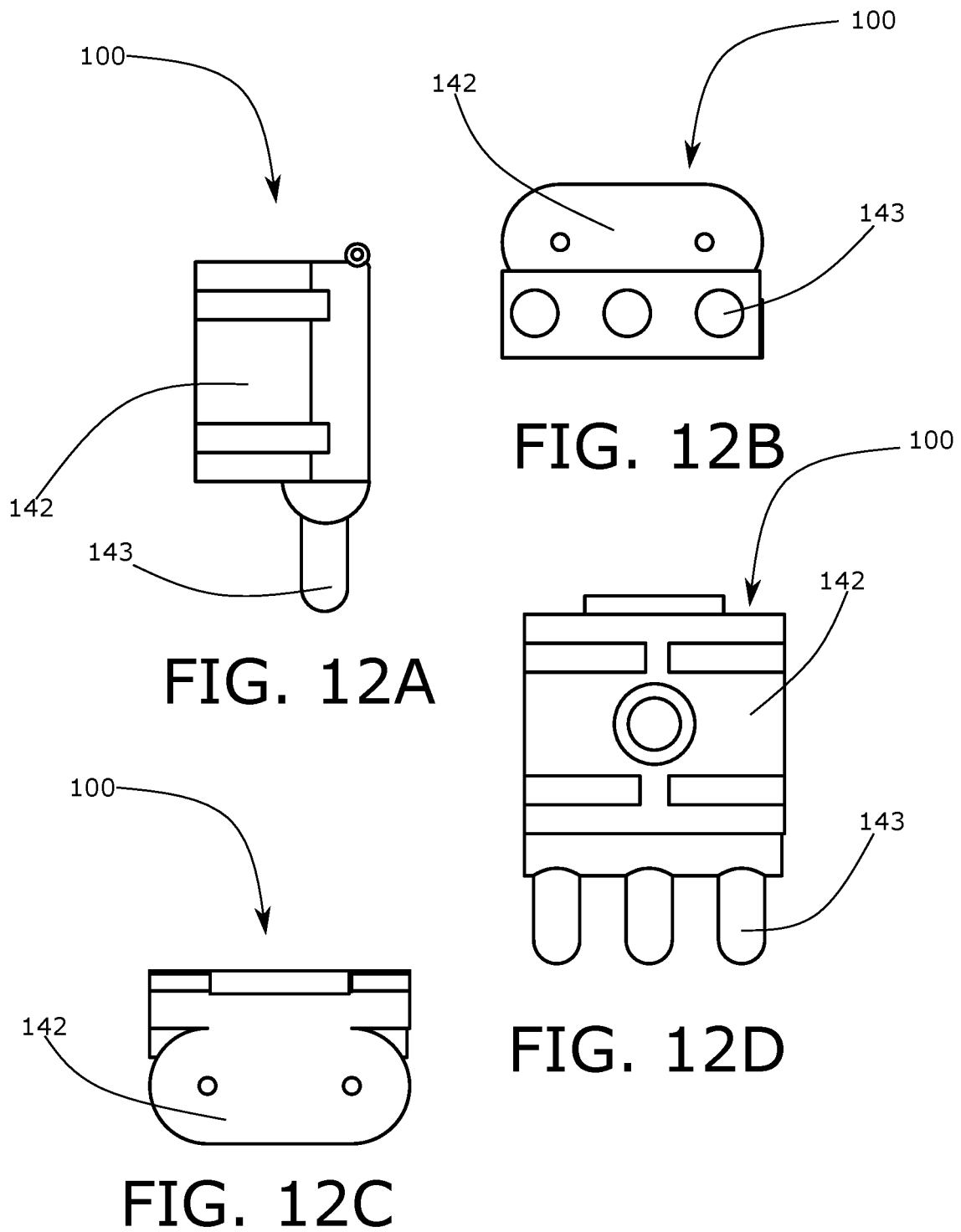
FIG. 12A is a side view of the device of FIG. 1 showing the mid-section of the head-assembly, according to an embodiment of the present disclosure.
FIG. 12B is a bottom view of the device of FIG. 1 showing the mid-section of the head-assembly, according to an embodiment of the present disclosure.
FIG. 12C is a top view of the device of FIG. 1 showing the mid-section of the head-assembly having the hinge, according to an embodiment of the present disclosure.
FIG. 12D is a front view of the device of FIG. 1 showing the mid-section of the head-assembly, according to an embodiment of the present disclosure.
Figure 13:
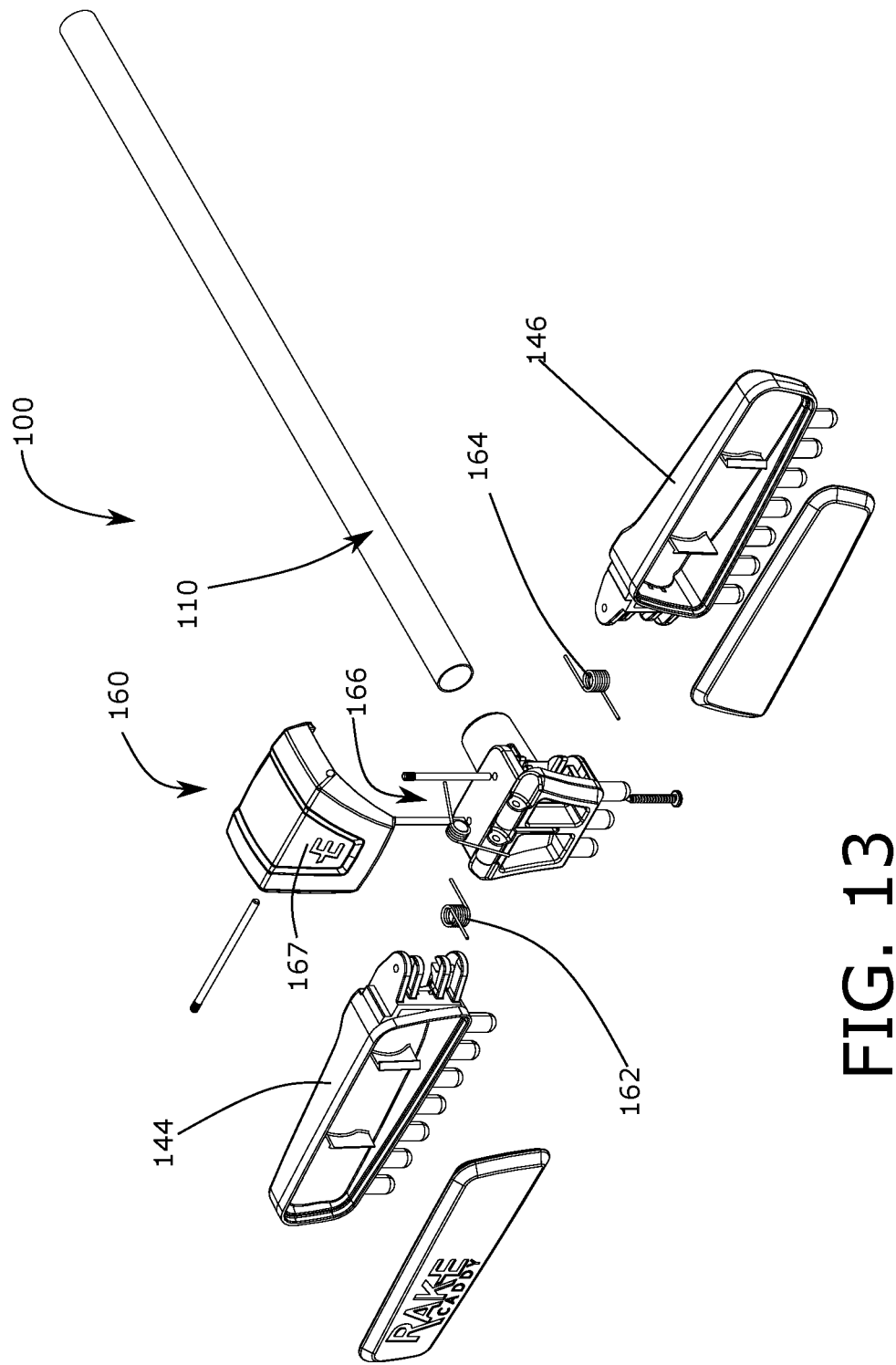
FIG. 13 is an exploded view of the device of FIG. 1 showing a pop-out mechanism of the head-assembly, according to an embodiment of the present disclosure.
Figure 16B:
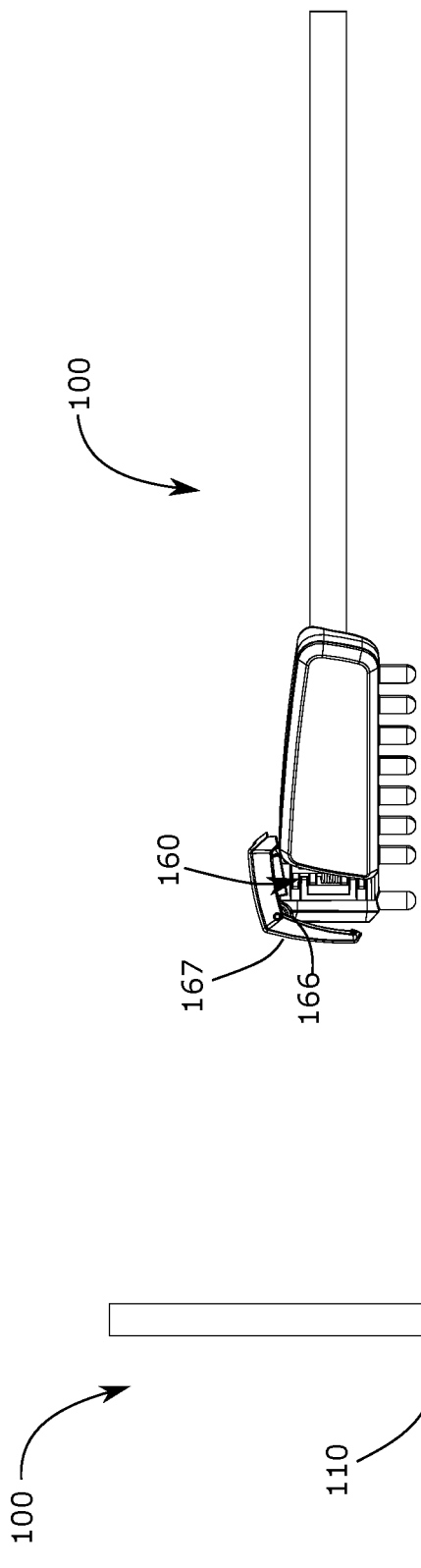
FIG. 16B is a side view of the device of FIG. 1 showing the head-assembly in the partially open position, according to an embodiment of the present disclosure.
Figure 16C:
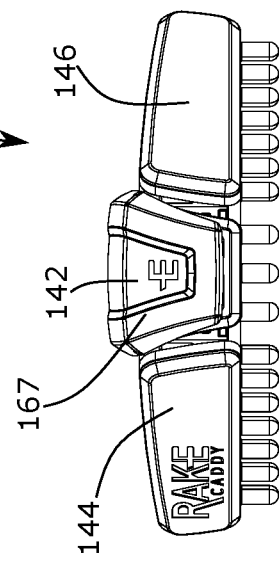
FIG. 16C is a front view of the device of FIG. 1 showing the head-assembly in the partially open position, according to an embodiment of the present disclosure.
Figure 16A:
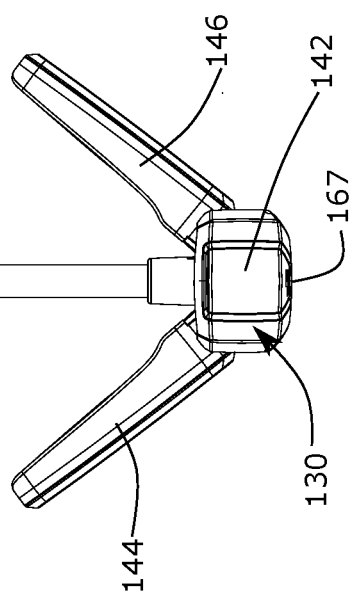
FIG. 16A is a top view of the device of FIG. 1 showing the head-assembly in a partially open position (between the folded-position and the in-use position), according to an embodiment of the present disclosure.

As shown in FIG. 2, in some embodiments, an attachment-means 150 may be provided on the device 100. The attachment-means 150 may be configured to attach the device 100 to a bag 20. Preferably, the bag 20 may be a golf bag 25. The attachment-means 150 may be at least one clamp, clip, magnet, hook and loop fastener, etc. Further, it should be appreciated that the bag 20 is not limited to being a golf bag 25.

Referring now to FIGS. 3A-4B showing various views of the device 100 of FIG. 1, according to an embodiment of the present disclosure. The shaft 110 may include an elongated profile having an adjustable length 111. Preferably, the adjustable length 111 may be telescopic. In this embodiment, the shaft 110 may include at least a main shaft-section 114 and a first telescoping-section 116. In some embodiments, the first telescoping-section 116 may be permanently attached to the shaft 110. In other embodiments, they may be removable. As shown, the first telescoping-section 116 may be slidably received within the main shaft-section 114. The main shaft-section 114 and the first telescoping-section 116 may each include a length of 19 inches, putting the shaft 110 at a total 38 inches in length when in an extended position 117.

The shaft 110 may further include a shaft locking means 115. The shaft locking means 115 may be configured to selectively lock the shaft 110 in the extended position 117, and selectively lock the shaft 110 in a retracted position 119. As shown, the shaft locking means 115 may be a thumb lock. In other, examples the shaft locking means 115 may be a pin and aperture system. In some other examples, the shaft locking means 115 may be a tongue and groove system. Other examples are contemplated.

In some embodiments shaft 110 may be adjusted in increments to three different lengths. The shaft 110 may include a second-telescoping section (not illustrated) which may be locked within the main shaft-section 114 at a first length. The first telescoping-section 116 may be slid out from the main shaft-section 114 and locked at a second length. The second telescoping-section may be slid out from the first telescoping-section 116 and locked at a third length. In some embodiments, the shaft 110, when fully extended may be 3 feet long. As such, each section (the main shaft-section 114), the first telescoping-section 116 and the second telescoping-section) may be 1 foot long. Further, in some embodiments and as shown in these figures, there may be a third telescoping-section (not illustrated). The third telescoping-section may be slid out from the second telescoping-section. In another embodiment, the shaft 110 may be 4 foot long.

The shaft 110 may be made from a lightweight material to provide for easy use, portability and storage. The lightweight material may preferably be durable and sturdy to allow pressure to be placed on the device 100 when in use. The lightweight material may be a plastic material, a steel material, etc. but is not limited to materials listed herein.

Referring now to FIGS. 5-16C showing various views of the device 100 of FIG. 1, according to an embodiment of the present disclosure. As shown, the head-assembly 130 may be attached about a second end 113 of the shaft 110. The head-assembly 120 may be made a plastic material such as polyethylene but is not limited to this material. The head-assembly 130 may include a mid-section 142, a first half 144 pivotally attached to a first side 131 of the mid-section 142, and a second half 146 pivotally attached to a second side 132 of the mid-section 142. The mid-section 142 may be attached to the second end 113 of the shaft. For example, as shown, the mid-section 142 may be what attaches the head-assembly 130 to the shaft. The first half 144 and the second half 146 may be pivotable between a folded-position 137 and an in-use position 136. The first half 144 and the second half 146 may each be attached to the mid-section 142 via a hinge, swivel joint, pivot joint, etc. (FIG. 11, FIG. 12C) to allow the first half 144 and the second half 146 to easily pivot between the in-use position 136 and the folded position 137.

The head-assembly 130 may include a top side 133 and a bottom side 134 relative to the surface 5 when the first half 144 and the second half 146 are in the in-use position 136. Further, the head-assembly 130 may include a horizontal axis 148 relative to the surface 5 (FIG. 1) when the first half 144 and the second half 146 are in the in-use position 136. The first half 144 and the second half 146 may be configured to pivot about the horizontal axis 148 to place the first half 144 and the second half 146 in the folded position 137. The folded position 137 may include the first half 144 and the second half 146 being pivoted upwardly relative to the horizontal axis 148 and the surface 5. Further, the folded position 137 may include a first length of the first half 144 and a second length of the second half 146 being substantially parallel to the adjustable length 111 of the shaft 110. The in-use position 136 may include the first length of the first half 144 and the second length of the second half 146 being substantially perpendicular to the adjustable length 111 of the shaft 110.

The first half 144 and the second half 146 in the in-use position 136 may be used to level the surface 5. The first half 144 may include a first set of teeth 145 attached to the bottom side 134 and the second half 146 may include a second set of teeth 147 attached to the bottom side 134. Preferably, the first half 144 and the second half 146 in the in-use position 136 together with the mid-section 142 may be used to facilitate leveling of the surface 5. In this embodiment, the mid-section 142 may also include a third set of teeth 143 attached to the bottom side 134. The first, second and third set of teeth (145, 147, 143) may be used collectively to rake the surface 5.

The first half 144 and the second half 144 may preferably be equal in size and shape. As such, the first set of teeth 145 and the second set of teeth 147 may include an equal number of teeth. There may be 8 teeth in the first set of 145 and 8 teeth in the second set of teeth 147. Further, the third set of teeth 143 may include less teeth than the first set of teeth 143 and the second set of teeth 147. As shown, there may be 3 teeth in the third set of teeth 143. However, it should be appreciated that the first and second set of teeth (145, 147) are not limited to 8, and the third set of teeth 143 are not limited to 3.

Preferably, the head-assembly 130 further may include a pop-out mechanism 160 configured to "pop" (spring) out the first half 144 and the second half 146 to place them in the in-use position 136. The pop-out mechanism 160 may include a first spring 162 in communication with the first half 144 and a second spring 164 in communication with the second half 146. The springs (162, 164) may impart a permanent bias on the first half 144 and the second half 146 toward the in-use position 136. For example, the first spring 162 and the second spring 164 may engagingly manipulate the first half 144 and the second half 146 into the in-use position 136 utilizing stored kinetic energy in the springs (162, 164). The first spring 162 and second spring 164 may be able to selectively move between tension and compression states to manipulate the first half 144 and the second half 146 as per user desire.

The pop-out mechanism 160 may include a latch means 166 configured to hold the first half 144 and the second half 146 in the folded-position 137. The latch means 166 may be in communication with the first spring 162 and the second spring 164 such that when the latch means 166 is disengaged, it causes the (spring-loaded) first spring 162 and the second spring 164 to spring the first half 144 and the second half 146 into the in-use position 136. Further, the pop-out mechanism 160 may include a button 167 in communication with the latch means 166. Actuation of the button 167 (for example, manually pressing the button 167) may release the latch means 166, and therefore cause the first spring 162 and the second spring 164 to spring the first half 144 and the second half 146 into the in-use position 136. As shown, the button 167 and the latch means 166 may be located about the mid-section 142 of the head-assembly 130. In this embodiment, a user may press the button 167 into a surface (such as a ground surface) to move the head-assembly 130 into the in-use position 136.

Looking now at FIGS. 14 and 15, the pop out mechanism further includes a latch 167 movable by a third spring between a first latch position and a second latch position. In the first latch position the latch retains the first half 144 and the second half 146 in either the folded or in-use position, and in the second latch position the latch permits movement of both the first half and the second half between the folded and in-use position. A third spring 166 imparts a permanent bias on the latch toward the first latch position.

Figure 17:
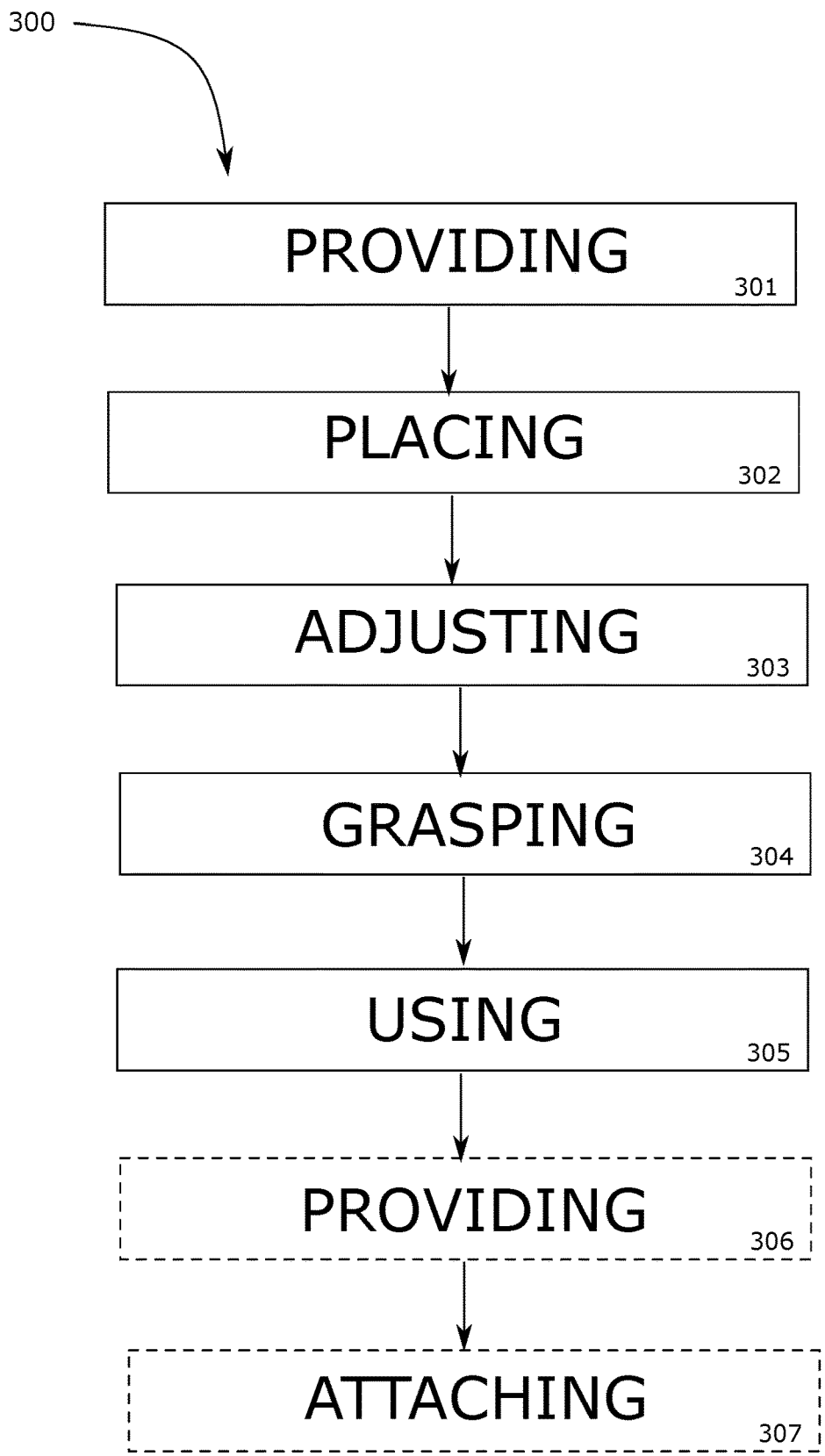
FIG. 17 is a flow diagram illustrating a method of using the device for leveling a surface, according to an embodiment of the present disclosure.

Referring now to FIG. 17 showing a flow diagram illustrating a method 300 of using a device for leveling a surface, according to an embodiment of the present disclosure. In particular, the method 300 may include one or more components or features of the device 100 as described above. As illustrated, the method of use 300 may include the steps of: step one 301, providing the device as above; step two 302, placing the first half and the second half of the head-assembly in the in-use position; step three 303, adjusting the adjustable length of the shaft to a desired position; step four 304, grasping the handle-means; and step five 305, using the device to level the surface with the head-assembly. The method 300 may further include the steps of: step six 306, providing the device as above comprising the attachment-means; and step seven 307, attaching the device to the bag for storage, via the attachment-means.

It should be noted that step six 306 and step seven 307 are optional steps and may not be implemented in all cases. Optional steps of method of use 300 are illustrated using dotted lines in FIG. 13 so as to distinguish them from the other steps of method of use 300. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for leveling a surface, are taught herein.

The embodiments of the invention described herein are exemplary and numerous modifications, variations and rearrangements can be readily envisioned to achieve substantially equivalent results, all of which are intended to be embraced within the spirit and scope of the invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A device for leveling a surface, the device comprising:
   a shaft including an elongated profile having an adjustable length;
   a handle attached to a first end of the shaft; and
   a head-assembly attached about a second end of the shaft, the head-assembly including a mid-section, a first half pivotally attached to a first side of the mid-section, and a second half pivotally attached to a second side of the mid-section, the mid-section being attached to the second end of the shaft, the first half and the second half being pivotable between a folded-position and an in-use position, and wherein the first half and the second half in the in-use position are used to level the surface,
   the head-assembly further includes a pop-out mechanism, the pop-out mechanism including a first spring in communication with the first half and a second spring in communication with the second half, and wherein the first spring and the second spring impart a permanent bias on the first half and the second half toward the in-use position,
   the pop out mechanism further including a latch movable by a third spring between a first latch position and a second latch position, in the first latch position the latch retains the first half and the second half in either the folded or in-use position, and in the second latch position the latch permits movement of both the first half and the second half between the folded and in-use position, the third spring imparting a permanent bias on the latch toward the first latch position.

2. The device of claim 1, further comprising an attachment-means configured to attach the device to a bag.

3. The device of claim 1, wherein the head-assembly includes a top side and a bottom side relative to the surface.

4. The device of claim 3, wherein the first half includes a first set of teeth attached to the bottom side; and wherein the second half includes a second set of teeth attached to the bottom side.

5. The device of claim 4, wherein the first half and the second half in the in-use position together with the mid-section are used to facilitate leveling of the surface.

6. The device of claim 5, wherein the mid-section includes a third set of teeth attached to the bottom side.

7. The device of claim 1, wherein the folded position includes a first length of the first half and a second length of the second half being substantially parallel to the adjustable length of the shaft, with neither half contacting the adjustable length of the shaft.

8. The device of claim 7, wherein the in-use position includes the first length of the first half and the second length of the second half being substantially perpendicular to the adjustable length of the shaft.

9. The device of claim 1, wherein the adjustable length is telescopic.

10. The device of claim 9, wherein the shaft includes at least a main shaft-section, and a first telescoping-section.

11. The device of claim 10, wherein the shaft includes a shaft lack configured to selectively lock the shaft in an extended position; and wherein the shaft lock is further configured to selectively lock the shaft in a retracted position.

12. A sand rake for leveling a sand surface, the sand rake comprising:
 a shaft including an elongated profile having an adjustable length, the adjustable length being telescopic, the shaft further including at least a main shaft-section, a first telescoping-section, and a shaft lock, the shaft lock configured to selectively lock the shaft in an extended position, and the shaft lock further configured to selectively lock the shaft in a retracted position;
 a handle attached to a first end of the shaft; and
 a head-assembly attached about a second end of the shaft, the head-assembly including a mid-section, a first half pivotally attached to a first side of the mid-section, and a second half pivotally attached to a second side of the mid-section, the mid-section being attached to the second end of the shaft, the first half and the second half being pivotable between a folded-position and an in-use position, the head-assembly further including a pop-out mechanism, the pop-out mechanism including a first spring in communication with the first half and a second spring in communication with the second half, the first spring and the second spring imparting a permanent bias on the first half and the second half toward the in-use position, the pop out mechanism further including a latch movable by a third spring between a first latch position and a second latch position, in the first latch position the latch retains the first half and the second half in either the folded or in-use position, and in the second latch position the latch permits movement of both the first half and the second half between the folded and in-use position, the third spring imparting a permanent bias on the latch toward the first latch position,
 the folded position including a first length of the first half and a second length of the second half being substantially parallel to the adjustable length of the shaft, the in-use position includes the first length of the first half and the second length of the second half being substantially perpendicular to the adjustable length of the shaft; and
 wherein the first half and the second half in the in-use position together with the mid-section are used to level the sand surface;
 wherein the head-assembly includes a top side and a bottom side relative to the surface when the first half and the second half are in the in-use position;
 wherein the first half includes a first set of teeth attached to the bottom side;
 wherein the second half includes a second set of teeth attached to the bottom side; and
 wherein the mid-section includes a third set of teeth attached to the bottom side.

13. The sand rake of claim 12, further comprising an attachment-means configured to attach the sand rake to a bag.

14. A method of using a device for leveling a surface, the method comprising the steps of:
 providing the device, the device including:
 a shaft including an elongated profile having an adjustable length;
 a handle attached to a first end of the shaft; and
 a head-assembly attached about a second end of the shaft, the head-assembly including a mid-section, a first half pivotally attached to a first side of the mid-section, and a second half pivotally attached to a second side of the mid-section, the mid-section being attached to the second end of the shaft, the first half and the second half being pivotable between a folded-position and an in-use position, and wherein the first half and the second half in the in-use position are used to level the surface, the head-assembly further includes a pop-out mechanism, the pop-out mechanism including a first spring in communication with the first half and a second spring in communication with the second half, and wherein the first spring and the second spring impart a permanent bias on the first half and the second half toward the in-use position, the pop out mechanism further including a latch movable by a third spring between a first latch position and a second latch position, in the first latch position the latch retains the first half and the second half in either the folded or in-use position, and in the second latch position the latch permits movement of both the first half and the second half between the folded and in-use position, the third spring imparting a permanent bias on the latch toward the first latch position;
 placing the first half and the second half of the head-assembly in the in-use position;
 adjusting the adjustable length of the shaft to a desired position;
 grasping the handle-means; and
 using the device to level the surface with the head-assembly.

15. The method of claim 14, further comprising the steps of:
 providing the device further comprising an attachment-means; and
 attaching the device to a bag for storage, via the attachment-means.

* * * * *